United States Patent
Jansen et al.

(10) Patent No.: US 6,379,449 B1
(45) Date of Patent: *Apr. 30, 2002

(54) PROCESS FOR THE PRODUCTION OF YELLOW TO RED PIGMENTS BASED ON NITRIDES AND OXIDENITRIDES

(75) Inventors: Martin Jansen, Leonberg; Eberhard Günther, Niederkassel; Hans-Peter Letschert, Hanau, all of (DE)

(73) Assignee: dmc² Degussa Metals Catalysts Cerdec AG, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,514

(22) Filed: Feb. 22, 2000

(30) Foreign Application Priority Data

Feb. 23, 1999 (DE) .......................... 199 07 618

(51) Int. Cl.⁷ ............................... C01B 21/06
(52) U.S. Cl. ................ 106/401; 106/453; 106/456; 106/479; 106/480; 106/455; 423/351; 423/353; 423/409; 423/412; 423/385
(58) Field of Search ................. 106/401, 419, 106/436, 450, 452, 453, 456, 479, 480, 455; 423/351, 353, 409, 412, 385

(56) References Cited

U.S. PATENT DOCUMENTS

| 2,461,020 A | | 2/1949 | Alexander | .................... 23/191 |
| 4,734,390 A | | 3/1988 | Marchand et al. | ............. 501/96 |
| 5,079,198 A | * | 1/1992 | Edler et al. | .................... 501/98 |
| 5,110,772 A | * | 5/1992 | Parker | ........................ 501/97 |
| 5,439,660 A | | 8/1995 | Jansen et al. | ................ 423/263 |
| 5,569,322 A | | 10/1996 | Jansen et al. | ................ 106/401 |
| 5,624,487 A | * | 4/1997 | Schmidt et al. | ............. 106/417 |
| 5,766,336 A | | 6/1998 | Jansen et al. | ................ 106/461 |
| 6,235,103 B1 | * | 5/2001 | Letschert et al. | ........... 106/401 |

FOREIGN PATENT DOCUMENTS

| DE | 369 298 | 2/1923 |
| DE | 34 43 622 | 5/1986 |
| DE | 43 17 421 | 12/1994 |
| EP | 0 184 951 | 6/1986 |
| EP | 0 571 251 | 11/1993 |
| EP | 0 697 373 | 2/1996 |
| GB | 979277 | 1/1965 |
| JP | 01069506 | 3/1989 |

OTHER PUBLICATIONS

Von G. Brauer et al., "Über das Tantalnitrid $Ta_3N_5$ und das Tantaloxidnitrid TaON", Zeitschrift Für Anorganische und Allgemeine Chemie Bd. 348, Nr. 5/6, 1966 Seiten 298–308 XP002133977.

* cited by examiner

Primary Examiner—C. Melissa Koslow
(74) Attorney, Agent, or Firm—Wenderoth, Lind & Ponack, L.L.P.

(57) ABSTRACT

Nitride or oxidenitride based red to yellow pigments, such as tantalum(V) nitride and oxidenitrides containing tantalum may be produced by passing ammonia over nitridable metal compounds, in particular oxide compounds, at 700 to 1250° C. According to the invention, nitriding proceeds in a rotary tube or fluidised bed reactor in the presence of an oxide from the series $SiO_2$, $ZrO_2$, $GeO_2$, $SnO_2$, $TiO_2$ and $HfO_2$ under conditions under which this oxide is substantially not nitrided.

10 Claims, No Drawings

PROCESS FOR THE PRODUCTION OF YELLOW TO RED PIGMENTS BASED ON NITRIDES AND OXIDENITRIDES

BACKGROUND OF THE INVENTION

1. Field of the Invention

This invention relates to a process for the production of red to yellow nitride or oxidenitride based pigments, in particular nitrides and oxidenitrides containing tantalum, by nitriding nitridable metal compounds with flowing ammonia at 700 to 1250° C. The nitrides and oxidenitrides are produced in pigment quality on an industrial scale.

2. Description of the Related Art

Coloured pigments are subject to differing considerations depending upon the type of application and the use of the articles coloured therewith. Toxicologically questionable constituents may be released from articles coloured with pigments based on oxide, sulfide or selenide heavy metal compounds or decorated using such pigments on contact with acidic or alkaline solutions, for example nickel, cobalt or chromium may be released from spinels, cadmium from cadmium sulfide yellow and cadmium and selenium from cadmium sulfoselenide red or orange. Another problem is the release of toxic heavy metals when articles coloured in this manner are landfilled or incinerated in waste incinerators.

The stated problems may be reduced or completely eliminated by using nitride or oxidenitride pigments based on innocuous metals, in particular nitrides and oxidenitrides containing tantalum. Such pigments in particular cover the yellow to red range of the spectrum.

Tantalum(V) nitride ($Ta_3N_5$), c.f. US-A 5,569,322, and oxidenitrides having a perovskite, spinel, pyrochlore and elpasolite structure, including pigments containing tantalum, c.f. EP-A 0 697 373, are known for colouring plastics, paints and for the production of stovable decorative colours and glazes. Such pigments may be obtained by nitriding suitable metal compounds, such as oxides, oxide hydrates, nitrates, carbonates, oxalates and halides, with ammonia at 700 to 1250° C. Hitherto known nitriding processes are not suitable for obtaining nitrides and oxidenitrides on an industrial scale because nitriding is incomplete and the colour tone and/or brightness are unsatisfactory from a coloristic viewpoint and/or because scaling up previous processes from the laboratory scale to the industrial scale would entail highly complex plant and equipment.

In the hitherto conventional nitriding process according to US-A 5,569,322 and EP-A 0 697 373, the powder or powder mixture to be nitrided is nitrided in corundum boats by passing ammonia over it in an externally heated tubular reactor. While the duration and/or temperature of nitriding may indeed be reduced by using mineralisers, for many applications, the mineralisers must be leached back out of the nitriding product. The process according to EP-A 0 184 951, in accordance with which oxidenitrides having a perovskite structure are nitrided by nitriding nitride, oxidenitride or oxide metal compounds with ammonia as the nitriding and reducing agent, also gives no indication of how the laboratory process may most conveniently be scaled up to industrial scale.

According to DE-A 34 43 622, titanium dioxide powder may be converted on an industrial scale into black titanium nitride powder by means of nascent nitrogen at 800° C. The source of the nascent nitrogen is ammonia, which is passed at a velocity of 3 cm/sec through the tower reactor equipped with stirrer blades. In this reaction, $Ti^{4+}$ is at least partially converted into $Ti^{3+}$ and red to yellow pigments are thus not obtained. Tantalum(V) nitride may be produced according to US-A 2,461,020 in a stirred reactor. In this case, a tantalum compound, such as $Ta_2O_5$, is reacted in an ammonia atmosphere in the presence of a readily oxidisable metal such as magnesium. The resultant magnesium oxide must be removed from the reaction product if the reaction product is to be usable as a pigment.

According to GB 979,277, nitrides of boron, aluminium and gallium may be obtained from the corresponding phosphides or arsenides with ammonia at 700 to 1200° C. in a fluidised bed. No other starting materials are mentioned. It is known from DE-PS 369 298 and EP 0 571 251 A1 to use a rotary kiln for nitriding reactions.

SUMMARY OF THE INVENTION

The object of the invention is to provide a process which may be performed on an industrial scale for the production of pigments of the stated type by nitriding suitable metal compounds with ammonia at 700 to 1250° C. The process should be simple to handle and give rise to homogeneous products.

DESCRIPTION OF THE PREFERRED EMBODIMENTS

This object is achieved by the process according to the main claim. A process has been found for the production of a red to yellow pigment based on a nitride or oxidenitride with at least one metal of a valence state in the range from +3 to +5, comprising nitriding of a pulverulent metal compound or of a mixture of metal compounds from the series of oxides, oxide hydrates, mixed oxides, carbonates, nitrates, oxidenitrides having a lower degree of nitriding than an oxidenitride to be produced, halides, oxidehalides and nitridehalides, wherein the oxygen of an oxidenitride to be produced originates from the metal compound(s) used, with ammonia flowing over the metal compound(s) at 700 to 1250° C., which process is characterised in that nitriding is performed in a rotary tube or fluidised bed reactor in the presence of at least one pulverulent oxide uniformly dispersed in the metal compound(s) to be nitrided and selected from the series $SiO_2$, $GeO_2$, $SnO_2$, $TiO_2$, $ZrO_2$ and $HfO_2$, wherein the selected nitriding temperature substantially excludes nitriding of the stated oxides of the tetravalent metals.

Although the metal compound(s) to be nitrided may be nitrided directly in a rotary tube or fluidised bed reactor, an oxide from the series $SiO_2$, $GeO_2$, $SnO_2$, $ZrO_2$ and $HfO_2$ or a mixture of such oxides is conveniently added as a diluent during nitriding of the metal compound(s) to be nitrided; the added oxides should themselves substantially not be nitrided under the nitriding conditions. The addition of one or more of the stated oxides, which may be added in a quantity of preferably 1 to 20 wt.%, favours nitriding and reduces any sintering of the pulverulent reaction mixture, which impairs nitriding. In this manner, homogeneous products are obtained. The process according to the invention is particularly suitable for nitriding a powder mixture containing tantalum.

Rotary tube reactors and fluidised bed reactors are known per se in specialist circles, but they have never hitherto been considered for the production of yellow to red nitride or oxidenitride based pigments. In rotary tube reactors, which are preferred according to the invention, the particles to be nitrided are constantly being uncovered, such that homogenous products may be obtained. Before nitriding, powder mixtures are conveniently homogenised by means of an intensive mill, such as a ball mill, such that the individual constituents are in intimate contact with each other and segregation is avoided in the rotary tube reactor. In this manner, oxidenitrides having at least two different metal atoms may be produced from two metal compounds. Preferably, however, uniform substances are introduced into the rotary tube reactor, for example spray-dried powders produced from two or more metal compounds, and mixed oxides or xerogel powders produced by a sol/gel process. The process according to the invention gives rise to a higher space/time yield than has been possible in hitherto known processes for the production of red to yellow pigments of the stated type.

Fluidised bed reactors ensure undisturbed contact between the particulate educt to be nitrided and ammonia, but the particle fineness conventional for pigment purposes entails downstream apparatus for separating and recirculating dusts.

The educt in fluidised bed nitriding should be uniform, i.e., where oxidenitrides having more than one metal atom are to be produced, the individual particles contain all the metal atoms in the suitable atomic ratio.

Nitriding may be performed using ammonia or a dried gas containing ammonia, with ammonia or an ammonia/nitrogen gas mixture containing at least 90% ammonia preferably being used. During nitriding, ammonia or a nitriding gas containing ammonia is passed through the reactor. When ammonia is used, the flow velocity is at least 0.5 cm/sec, preferably at least 1 cm/sec; a flow velocity of 2 to 3 cm/sec is particularly preferred.

The person skilled in the art will adjust the nitriding temperature to the starting metal compounds used. A preferred temperature range is from 800 to 1000° C. Long reaction times are frequently necessary at lower temperatures. At higher temperatures, there is a risk of the nitride dissociating into metal and nitrogen, undesirably reducing the quality of the resultant nitride or oxidenitride pigment.

Nitride or oxidenitride based red to yellow pigments in particular have a $Ta_3N_5$, spinel, perovskite, elpasolite or pyrochlore structure, but other crystal forms are not excluded. The process of the invention is in particular suitable for the production of red tantalum(V) nitride and red-orange oxidenitrides of the formula $Ta_{3-x}Zr_xN_{5-x}O_x$, in which x is a number greater than 0 up to the saturation limit of the $Ta_3N_5$ lattice. The stated oxidenitrides are obtainable from (Ta,Zr) xerogels according to J. Mater. Chem. 1994, 4(8), 1293–1301; the saturation limit is at approx. x=0.6.

The process is also suitable for the production of oxidenitrides, as described in EP-A 0 697 373. Examples of these are:

a) coloured pigments based on oxidenitrides of perovskite structure, the nitrogen to oxygen atomic ratio of which determines the colour, having the general formulae
$A_{1-u}A'_u B\ O_{2-u}N_{1+u}$ or
$A'B_{1-w}B'_w O_{1+w}N_{2-w}$
in which A, A', B and B' denote one or more cations from the series
A: $Mg^{2+}$ [sic], $Ca^{2+}$, $Sr^{2+}$, $Ba^{2+}$
A': $Ln^{3+}$ (rare earth metal), $Bi^{3+}$, $Al^{3+}$, $Fe^{3+}$
B: $V^{5+}$, $Nb^{5+}$, $Ta^{5+}$,
B': $Ti^{4+}$, $Zr^{4+}$, $Hf^{4+}$, $Sn^{4+}$, $Ge^{4+}$ and
u and w denote a number in the range from 0 to 1;

b) oxidenitrides crystallised in the pyrochlore structure of the general formulae
$A_x A'_{2-x} B_2 O_{5+x} N_{2-x}$ or
$A'_2 B_{2-y} B'_y O_{5+y} N_{2-y}$
in which A, A', B and B' denote one or more cations from the series
A: $Mg^{2+}$, $Ca^{2+}$, $Sr^{2+}$, $Ba^{2+}Zn^{2+}$;
A': $Ln^{3+}$ (=rare earth element), $Bi^{3+}$, $Al^{3+}$, $Fe^{3+}$;
B: $V^{5+}$, $Nb^{5+}$, $Ta^{5+}$, $Mo^{5+}$, $W^{5+}$;
B': $Ti^{4+}$, $Zr^{4+}$, $Hf^{4+}$, $Sn^{4+}$, $Ge^{4+}$, $Si^{4+}$, $Nb^{4+}$, $Ta^{4+}$ and
x and y denote a number from 0 to 2.

c) oxidenitrides crystallised in the spinel structure of the general formulae
$C\ D_{2-m}D'_m O_{4-m}\ N_m$ or
$C_{1-n}\ C'_n D_2\ O_{4-n}N_n$,
in which C, C', D and D' denote one or more cations from the series
C: $Mg^{2+}$, $Ca^{2+}$, $Mn^{2+}$, $Fe^{2+}$, $Co^{2+}$, $Ni^{2+}$, $Zn^{2+}$;
D: $Al^{3+}$, $Ga^{3+}$, $In^{3+}$, $Ti^{3+}$, $V^{3+}$, $Cr^{3+}$, $Fe^{3+}$, $Co^{3+}$, $Ni^3$;
D': $Ti^{4+}$, $Zr^{4+}$, $Hf^{4+}$, $Sn^{4+}$, $Ge^{4+}$, $Si^{4+}$, $Nb^{4+}$, $Ta^{4+}$;
C': $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$ and
m denotes a number greater than 0 to 2 and
n denotes a number from 0 to 1;

d) oxidenitrides crystallised in the elpasolite structure of the general formula
$A'_2Q\ B'O_{5-z}N_{1+z}$,
in which z denotes 0, 1 or 2 and, when z=0, Q is a divalent metal ion C, when z=1, Q is a trivalent metal ion A" and, when z=2, Q is a tetravalent metal ion D, of the formulae
$A'_2\ C\ B\ O_5\ N$ or
$A'_2\ A''\ B\ O_4\ N_2$
in which A', B, C and D have the above-stated meaning and A" denotes $Ln^{3+}$ or $Bi^{3+}$.

The substances stated in the main claim are suitable as oxidenitride-forming metal compounds. Oxides, mixed oxides, oxide hydrates, carbonates and nitrates are preferred. The metal atoms present in the product are used in the form of one or more educts in the stoichiometric atomic ratio.

According to another embodiment, nitriding proceeds in the rotary tube in the presence of a flux from the series of ammonium salts of carbonic acid, a lower carboxylic acid or a boric acid, boric acids, boric anhydrides, alkali metal halides or alkaline earth metal halides. Fluxes may be added in a quantity of up to 20 wt. %, preferably of 0.5 to 5 wt. %.

Depending upon the selected reaction temperature and the composition of the pulverulent mixture of substances to be nitrided, partial sintering may occur in the rotary tube. It has been found that the duration of nitriding may be shortened and/or pigment quality improved if nitriding proceeds in the rotary tube in two stages; the reaction product from the first stage is ground and then introduced into the second rotary tube stage.

The process according to the invention is very simple to perform. Red to yellow pigments of elevated colouring quality are obtainable on an industrial scale.

The following Examples illustrate the process according to the invention. However, the Examples should not limit the spirit and scope of the appended claims.

EXAMPLES

Production of the pigments:

Example 1 (B1)

300 g of conventional commercial tantalum(V) oxide (purity >99.9%, $d_{50}$=0.5 μm) were combined with 6% of silicon dioxide (F 500 from Quarzwerke Frechen, $D_{50}=3.4$ µm) and homogenised. The mixture was then heated to 910° C. with ammonia (1300 l/h) for 12 hours in a silica glass rotary tube ($d_r=14$ cm, $1=50$ cm) (rotational speed of rotary tube: 1 rpm). A red powder was obtained with the colour values stated in the table.

Example 2 (B2)

300 g of conventional commercial tantalum(V) oxide (purity >99.9%) were combined with 4 wt. % of precipitated silica (Sipernat 22S from Degussa) and homogenised. The mixture was then heated to 910° C. with ammonia (1300 l/h) for 12 hours in a silica glass rotary tube (rotational speed of rotary tube: 1 rpm). A red powder was obtained as the product—see table.

Example 3 (B3)

300 g of conventional commercial tantalum(V) oxide (purity >99.9%) were combined with 5 wt. % of basic zirconium carbonate (Kynoch Kaapstreek) and 6 wt. % of precipitated silica (Sipernat 22S) and homogenised. The mixture was then heated to 910° C. with ammonia (1300 l/h) for 12 hours in a silica glass rotary tube (rotational speed of rotary tube: 1 rpm). A red powder was obtained as the product—see table.

Comparative Example 1 (VB1)

a) Production of Tantalum Oxide Hydrate:

10 g of tantalum(V) chloride are heated to boiling in 400 ml of conc. hydrochloric acid. The mixture is then diluted with 80 ml of water and tantalum-oxide hydrate is precipitated at pH 7 with conc. ammonia solution. The precipitate is washed until free of chloride, suspended with ethanol and dried at 120° C. The x-ray amorphous product has a residual water content of 14.9 wt. % (after calcining at 1000° C.).

b) Nitriding;

1 g of this product is then placed in a corundum boat and heated to 820° C. for 80 hours in a stream of ammonia (9 l/h). A red product is obtained—see table.

Example 4 (B4)

300 g of tantalum oxide hydrate according to VB a) were nitrided in a rotary tube ($d_r=14$ cm; $1=50$ cm; 1 rpm) for 12 hours at 910° C. in a 1300 l/h stream of $NH_3$. The colour values are stated in the table; they surpass those of the Comparative Example.

Colour Property Testing of the Powders Obtained:

The powders produced in accordance with the above-stated instructions were incorporated into a PVC plastisol and their colouring properties tested. To this end, 0.7 g of the particular sample and 2 g of plastisol were mixed and dispersed in a pigment grinding machine. 300 µm thick coats of the pastes were produced with a slider. Gelation was performed by heating to 140° C. within 10 minutes. The L*a*b* colour values were measured with a spectrophotometer and converted into system values (DIN 5033, part 3). The colour values are stated in the following table.

TABLE

| Test | L* | a* | b* |
|------|-------|-------|-------|
| B1 | 37.61 | 36.82 | 44.67 |
| B2 | 37.88 | 42.41 | 48.30 |
| B3 | 35.04 | 41.06 | 43.50 |

TABLE-continued

| Test | L* | a* | b* |
|------|-------|-------|-------|
| VB | 35.21 | 38.03 | 41.44 |
| B4 | 35.24 | 40.11 | 42.63 |

Comparative Example 2 (VB2)

Example 1 was repeated with the difference that no silicon dioxide was added. The colour values in PVC plastisol (testing as stated above) are:

L* 37.99
a* 29.68
b* 35.78

The colour values differ substantially from Example B1 according to the invention with regard both to the low a* value and to the low b* value.

What is claimed is:

1. A process for producing a red to yellow pigment based on a nitride or oxidenitride with at least one metal of a valence state in the range from +3 to +5, comprising nitriding a pulverulent metal compound or a mixture of metal compounds from the series of oxides, oxide hydrates, mixed oxides, carbonates, nitrates, oxidenitrides having a lower degree of nitriding than an oxidenitride to be produced, halides, oxidehalides and nitridehalides excluding $SiO_2$, $GeO_2$, $SnO_2$, $TiO_2$, $ZrO_2$ and $HfO_2$, wherein the oxygen of an oxidenitride to be produced originates from the metal compound(s) used, with ammonia flowing over the metal compound(s) at 700 to 1250° C., and wherein the nitriding step is performed in a rotary tube or fluidised bed reactor in the presence of at least one pulverulent oxide uniformly dispersed in the metal compound(s) to be nitrided and selected from the series $SiO_2$, $GeO_2$, $SnO_2$, $TiO_2$, $ZrO_2$ and $HfO_2$, and wherein the selected nitriding temperature substantially excludes nitriding of the pulverulent oxides of the tetravalent metals from said series $SiO_2$, $GeO_2$, $SnO_2$, $TiO_2$, $ZrO_2$ and $HfO_2$.

2. The process according to claim 1, wherein the nitriding step proceeds in the presence of a flux from the series of ammonium salts of carbonic acid, a lower carboxylic acid, boric acids, boric anhydrides, alkali metal halides or alkaline earth metal halides.

3. The process according to claim 1, wherein the ammonia is passed through the reactor at a flow velocity of at least 1 cm/sec.

4. The process according to claim 2, wherein the ammonia is passed through the reactor at a flow velocity of at least 1 cm/sec.

5. The process according to claim 1, wherein the nitriding step is performed in the rotary tube in two stages, and wherein the nitriding product from the first stage is ground and then introduced into the second stage.

6. The process according to claim 2, wherein the nitriding step is performed in the rotary tube in two stages, and wherein the nitriding product from the first stage is ground and then introduced into the second stage.

7. The process according to claim 3, wherein the nitriding step is performed in the rotary tube in two stages, and wherein the nitriding product from the first stage is ground and then introduced into the second stage.

8. The process according to claim 4, wherein the nitriding step is performed in the rotary tube in two stages, and wherein the nitriding product from the first stage is ground and then introduced into the second stage.

9. The process according to claim 1, wherein the red to yellow pigment is based on a nitride or oxidenitride having a $Ta_3N_5$, spinel, perovskite, elpasolite or pyrochlore structure.

10. The process according to claim 1, wherein the red to yellow pigment is based on a) oxidenitrides of perovskite structure, the nitrogen to oxygen atomic ratio of which determines the colour, having the general formulae
$A_{1-u}A'_uBO_{2-u}N_{1+u}$ or
$A'B_{1-w}B'_wO_{1+w}N_{2-w}$,
wherein A, A', B and B' denote one or more cations from the series
A: $Mg^{2+}$, $Ca^{2+}$, $Sr^{2+}$, $Ba^{2+}$,
A': $Ln^{3+}$, $Bi^{3+}$, $Al^{3+}$, $Fe^{3+}$,
B: $V^{5+}$, $Nb^{5+}$, $Ta^{5+}$,
B': $Ti^{4+}$, $Zr^{4+}$, $Hf^{4+}$, $Sn^{4+}$, $Ge^{4+}$ and
u and w denote a number in the range from 0 to 1;

b) oxidenitrides crystallised in the pyrochlore structure of the general formulae
$A_xA'_{2-x}B_2O_{5+x}N_{2-x}$ or
$A'_2B_{2-y}B'_yO_{5+y}N_{2-y}$,
wherein A, A', B and B' denote one or more cations from the series
A: $Mg^{2+}$, $Ca^{2+}$, $Sr^{2+}$, $Ba^{2+}$, $Zn^{2+}$,
A': $Ln^{3+}$, $Bi^{3+}$, $Al^{3+}$, $Fe^{3+}$,
B: $V^{5+}$, $Nb^{5+}$, $Ta^{5+}$, $Mo^{5+}$, $W^{5+}$,
B': $Ti^{4+}$, $Zr^{4+}$, $Hf^{4+}$, $Sn^{4+}$, $Ge^{4+}$, $Si^{4+}$, $Nb^{4+}$, $Ta^{4+}$ and
x and y denote a number from 0 to 2;

c) oxidenitrides crystallised in the spinel structure of the general formulae
$CD_{2-m}D'_mO_{4-m}N_m$ or
$C_{1-n}C'_nD_2O_{4-n}N_n$,
wherein C, C', D and D' denote one or more cations from the series
C: $Mg^{2+}$, $Ca^{2+}$, $Mn_{2+}$, $Fe^{2+}$, $Co^{2+}$, $Ni^{2+}$, $Zn^{2+}$,
D: $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$,
D': $Ti^{4+}$, $Zr^{4+}$, $Hf^{4+}$, $Sn^{4+}$, $Ge^{4+}$, $Si^{4+}$, $Nb^{4+}$, $Ta^{4+}$,
C': $Al^{3+}$, $Ga^{3+}$, $In^{3+}$, $Ti^{3+}$, $V^{3+}$, $Cr^{3+}$, $Fe^{3+}$, $Co^{3+}$, $Ni^{3+}$ and
m denotes a number greater than 0 up to 2, and
n denotes a number from 0 to 1; or d) oxidenitrides crystallised in the elpasolite structure of the general formula:
$A'_2QB'O_{5-z}N_{1+z}$,
wherein z denotes 0, 1 or 2 and,
when z=0, Q is a divalent metal ion C,
when z=1, Q is a trivalent metal ion A" and,
when z=2, Q is a tetravalent metal ion D, of the formulae
$A'_2CBO_5N$ or
$A'_2A"BO_4N_2$
wherein A', C and D have the above-stated meaning,
A" denotes $Ln^{3+}$ or $Bi^{3+}$, and
B denotes $V^{5+}$, $Nb^{5+}$ or $Ta^{5+}$.

* * * * *